Patented Apr. 28, 1931

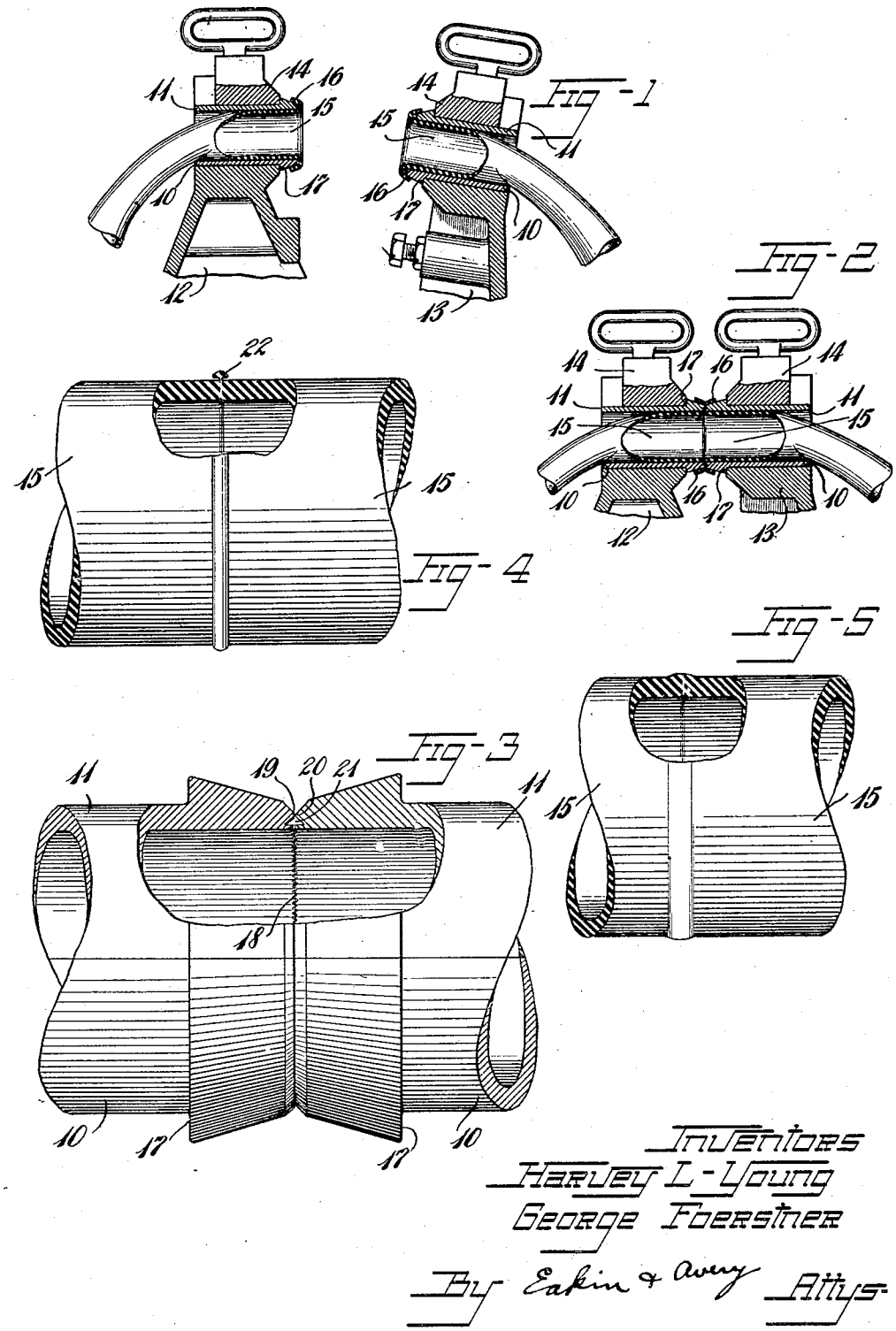

1,802,491

UNITED STATES PATENT OFFICE

HARVEY L. YOUNG AND GEORGE FOERSTNER, OF AKRON, OHIO, ASSIGNORS TO THE B. F. GOODRICH COMPANY, OF NEW YORK, N. Y., A CORPORATION OF NEW YORK

ANNULAR TUBE AND METHOD AND APPARATUS FOR SPLICING THE SAME

Application filed December 28, 1928. Serial No. 328,972.

This invention relates to hollow rubber articles and especially to annular inflatable tubes such as inner tubes for pneumatic tires, and to methods and apparatus for splicing the same, and in some of its aspects the invention is an improvement upon the invention of Patent No. 1,687,811 to Noah L. Warner, for tube splicing method and apparatus.

The chief objects of the invention are to provide an annular tube with a transverse seam of superior tensile strength and impermeability; to provide an annular tube with spliced ends having a reinforcing layer of rubber over said splice; and to provide an improved method and apparatus for forming said splice and the reinforcement therefor. Other objects will be manifest as the specification proceeds.

Of the accompanying drawings:

Fig. 1 is a fragmentary sectional view of a pair of splicing jaws for forming a splice in an inner tube, and the work therein, the jaws being in open or inoperative position.

Fig. 2 is a similar view of the closed or operative position of the splicing jaws.

Fig. 3 is a fragmentary elevation, on a larger scale, of a pair of splicing sleeves, parts being sectioned and broken away.

Fig. 4 is an elevation of a splice in two tube-ends as the same is produced by my improved apparatus, a part being in section.

Fig. 5 is a view similar to Fig. 4 showing the finished splice before vulcanization of the tube.

Referring to Fig. 3 of the drawings, each of the splicing sleeves comprises a lower section 10 and an upper section 11. Said sleeves may be suitably mounted in the supporting and manipulating apparatus shown in the aforesaid Patent No. 1,687,811, or they may be mounted in the apparatus shown in Figs. 1 and 2 of the present drawings wherein 12 is a stationary arm and 13 is an arm movable relatively thereto, the upper ends of said arms being formed with respective semi-cylindrical sockets adapted to receive the sleeve sections 10. The sleeve sections 11 are secured in semi-cylindrical sockets formed in the lower faces of cap or closure member 14, 14 hinged upon the upper ends of the arms 12 and 13 respectively, for convenience in bringing the sections of each sleeve together to surround the tube ends 15, 15 to be spliced, and in opening the sleeves to release the tube after the splicing operation.

The sleeve sections project from the adjacent sides of their mountings to permit the tube ends to be cuffed back over them, the cuffed back portions, shown at 16, 16 being severed in the splicing operation. Each sleeve section preferably is formed with a shoulder 17 abutting its mounting to withstand the pressure with which the sleeves are brought together.

At their meeting edges the sleeves preferably are complementally serrated as shown at 18, Fig. 3, in a relatively narrow zone radially of the sleeves, to provide a seam of greater length than the circumference of the tube, and the serrations are of uniform depth at their outer and inner peripheries so that in the splicing operation when the sleeves are brought together upon the tube ends the intervening material is not severed, but is pinched to extreme thinness along a zig-zag or devious line. The serrated form of the sleeves provides a kneading or rubbing of the stock of the contacting surfaces of the tube ends as well as a pressing together thereof with the result that a strong union of said surfaces is effected adjacent the serrated portion both inside and outside of the tube.

In a region outside of or circumscribing their serrated portions 18, the sleeve members are formed with means for severing the cuffed back portions 16 of the tube ends, said means comprising a flat face 19 formed on one of the sleeve members and a tapered sharp-edged portion 20 formed on the other sleeve member. The sleeves between the flat face 19 and edge portion 20 and the serrations 18 are formed respectively with circumferential grooves so that when the sleeves are together in cutting relation they define an annular recess or cavity 21 which is substantially triangular in cross section with the apex of the triangle disposed outwardly.

When the splicing sleeves are brought together upon the cuffed ends of the tube, the cavity 21 is filled with the material of the tube, which material is compacted therein because of the sloping sides of the cavity at each side of the cutting plane where the flat face 19 and cutting edge 20 meet. After the splicing sleeves have been brought together and the cuffed portions 16 severed from the tube ends by the cutting edge 20, the severed rings of stock are broken and removed from the sleeves, and the latter then are moved apart and opened to permit removal of the spliced tube, which presents the appearance shown in Fig. 4, a substantially triangular, annular band or reinforcement of rubber 22 formed in the cavity 21 remaining attached to the tube by the webs of rubber squeezed thin between the serrated portions of the sleeves.

The band 22 is then rolled down onto the body portion of the tube, as shown in Fig. 5, so as completely to cover the serrated butt-splice therein. The annular, spliced, hollow tube is then vulcanized, preferably by enclosing it in a mold and heating it under internal pressure and thus flattening to cylindrical form the outer face of the reinforced seam.

It will be seen that in addition to the normally strong seam formed by the interfitted serrated edges of the tube ends, we provide the additional strength to the reinforcing band 22, which in the vulcanization of the tube, coalesces therewith to provide a unitary structure. Moreover, the meeting planes of the serrated ends of the tube do not extend completely through the tube in the finished structure, being covered by the band 22, so there is no straight line of juncture in any direction, with the result that a very strong seam is provided.

Our invention is susceptible of modification within the scope of the appended claims.

We claim:

1. An annular rubber tube formed with a transverse butt splice, and a circumscribing reinforcement vulcanized upon said splice, said reinforcement comprising an unsevered portion of the original tube structure.

2. An annular tube as defined in claim 1 in which the butt splice comprises interfitted serrated portions of the tube.

3. The method of joining two pieces of adhesive stock in a seam which comprises pressing the two pieces together to cause them to adhere in the zone of the seam and concurrently forming a reinforcing strip of the stock along the said zone and then pressing the reinforcing strip onto the said zone.

4. A method as defined in claim 3 in which the reinforcing strip is formed of stock integral with the said pieces.

5. The method of splicing together two tube ends of adhesive stock which comprises cuffing back the tube ends and joining them in a butt splice along a devious, zig-zag line, concurrently forming a reinforcing band about said splice, and then pressing the reinforcing band onto the splice.

6. A method as defined in claim 5 in which the reinforcing band is formed from excess material of the cuffed back portions of the tube.

7. The method of splicing together two tube ends of adhesive stock which comprises cuffing back the tube ends and forcing them together to form a seam, substantially severing the excess cuffed back stock at the seam and completely severing it at a region of greater circumference than the seam, to form an integral band thereabout, and then pressing said band onto the seam.

8. Apparatus for joining together two pieces of adhesive stock in a seam, said apparatus comprising a pair of stock-pressing members formed with seaming means adapted to press the pieces adhesively together in the zone of the seam and with severing means extending along the said seaming means and adapted to form material of the pieces into a reinforcing strip along the said zone and to sever excess stock therefrom as the two stock-pressing members are forced toward each other.

9. Apparatus as defined in claim 8 in which the seaming means comprises complementally serrated faces.

10. Seaming apparatus comprising a pair of presser members formed with complemental serrations on their respective seam-pressing faces and with cutting faces extending along the same, the cutting faces and serrations being separated by a recess for the reception of reinforcing stock.

11. Tube splicing apparatus comprising a pair of splicing sleeves formed on their end faces with splicing means adapted to pinch but not sever material therebetween, and formed with concentric severing means in a region of greater circumference.

12. Tube splicing apparatus as defined in claim 11 in which the splicing means comprises complemental serrations on the adjacent ends of the splicing sleeves.

In witness whereof we have hereunto set our hands this 26th day of December, 1928.

HARVEY L. YOUNG.
GEORGE FOERSTNER.